(12) United States Patent
Shibuya (10) Patent No.: US 7,651,820 B2
(45) Date of Patent: Jan. 26, 2010

(54) GEL ELECTROLYTE AND GEL ELECTROLYTE BATTERY

(75) Inventor: Mashio Shibuya, Fukushima (JP)

(73) Assignee: Sony Corporation, Tokyo (JP)

( * ) Notice: Subject to any disclaimer, the term of this patent is extended or adjusted under 35 U.S.C. 154(b) by 300 days.

(21) Appl. No.: 11/556,563

(22) Filed: Nov. 3, 2006

(65) Prior Publication Data

US 2007/0111104 A1 May 17, 2007

(30) Foreign Application Priority Data

Nov. 14, 2005 (JP) .............................. P2005-329295

(51) Int. Cl.
*H01M 6/14* (2006.01)
(52) U.S. Cl. .................. 429/303; 429/300; 429/316; 429/231.1; 429/231.3; 429/231.8; 429/231.4; 429/231.95; 429/233; 429/247; 429/330; 429/332
(58) Field of Classification Search .............. 429/303, 429/300, 316, 231.1, 231.3, 231.8, 231.4, 429/231.95, 233, 247, 330, 332
See application file for complete search history.

(56) References Cited

U.S. PATENT DOCUMENTS 6,465,134 B1  10/2002  Shibuya et al.
6,815,124 B2 *  11/2004  Suzuki et al. ............... 429/303
6,818,352 B2 *  11/2004  Daido et al. ........... 429/231.95

FOREIGN PATENT DOCUMENTS

| JP | 10-032019 | 2/1998 |
|---|---|---|
| JP | 11-312535 | 11/1999 |
| JP | 2000-243447 | 9/2000 |
| JP | 2001-167797 | 6/2001 |
| JP | 2002-117899 | 4/2002 |
| JP | 2003-077537 | 3/2003 |
| WO | 99/38225 | 7/1999 |
| WO | 01/95421 | 12/2001 |

* cited by examiner

*Primary Examiner*—Laura S Weiner
(74) *Attorney, Agent, or Firm*—K&L Gates LLP (57) ABSTRACT

A gel electrolyte and a gel electrolyte battery are provided. The gel electrolyte includes a matrix polymer; a nonaqueous solvent; and an electrolytic solution having an electrolyte salt containing lithium dissolved in the nonaqueous solvent, in which the matrix polymer is swollen with the electrolytic solution. The matrix polymer comprises polyvinylidene fluoride copolymerized with at least hexafluoropropylene in an amount of 3 wt % or more and 7.5 wt % or less. The nonaqueous solvent comprises ethylene carbonate; and at least one solvent selected from the group consisting of dimethyl carbonate, ethylmethyl carbonate, diethyl carbonate, ethylpropyl carbonate, ethyl butyl carbonate, and dipropyl carbonate. The content of the ethylene carbonate in the nonaqueous solvent is 15 wt % or more and 55 wt % or less, and the total content of the at least one solvent in the nonaqueous solvent is 30 wt % or more and 85 wt % or less.

6 Claims, 3 Drawing Sheets

GEL ELECTROLYTE AND GEL ELECTROLYTE BATTERY

CROSS REFERENCES TO RELATED APPLICATIONS

The application claims priority to Japanese Patent Application JP 2005-329295 filed in the Japanese Patent Office on Nov. 14, 2005, the entire contents of which is being incorporated herein by reference.

BACKGROUND

The present application relates to a gel electrolyte and a gel electrolyte battery. More particularly, the present invention relates to a nonaqueous gel electrolyte obtained from a nonaqueous solvent gelled with a matrix polymer and a nonaqueous gel electrolyte battery using the same.

In recent years, as power sources for portable electronic devices, batteries are very important from an industrial point of view. For reducing the size and weight of electronic devices, batteries which are lightweight and efficiently use spaces in the devices are demanded. For meeting the demand, lithium batteries having large energy density and power density are the most promising.

Especially, batteries having high selectivity of shape, sheet-type batteries having a reduced thickness and a large area, or card-type batteries having a reduced thickness and a small area are desired, but the method employed in the past, in which a metal can is used in the external packaging of a battery makes it difficult to produce a battery having a reduced thickness and a large area.

For solving the problem, studies are made on batteries using a gel electrolyte obtained by adding a substance having a certain bonding action to a liquid electrolyte, or by gelling a liquid electrolyte with a polymer. In these batteries, the electrode and the electrolyte have an adhesive force therebetween, and hence the battery elements including the electrolytic solution can be fixed together. Therefore, no strong metal external packaging is needed, and an external packaging in a film form can be used, enabling production of a thin, lightweight, and inexpensive battery.

A nonaqueous electrolyte has poor ion conduction properties, as compared to an aqueous electrolytic solution used in an alkaline battery or a nickel-cadmium (Ni—Cd) battery. Water is a unique and excellent solvent having two features that the viscosity is so low that ions easily move in water and that the permittivity is so high that a salt is easily dissolved in water.

In the nonaqueous electrolyte, a mixed solvent of a solvent having a low viscosity and a solvent having a high permittivity is generally used. As the former, dimethyl carbonate (DMC), ethylmethyl carbonate (EMC), or diethyl carbonate (DEC), ethyl butyl carbonate (EBC) which is a linear carbonate, is used, and, as the latter, ethylene carbonate (EC) or propylene carbonate (PC), which is a cyclic carbonate, is often used.

Examples of materials for the matrix polymer in a polymer battery include polyethers, such as polyvinylidene fluoride (PVdF), polyacrylonitrile (PAN), polyethylene oxide (PEO), and polypropylene oxide (PPO), and acrylate resins, such as polymethacrylate.

An acrylate resin is produced mainly by a crosslinking method. A battery having electrodes and a separator contained in external packaging and having no electrolytic solution is prepared, and an electrolytic solution, monomers, and a polymerization initiator are mixed together and charged into the battery. After charging the mixture into the battery, the mixture is gelled by crosslinking due to heat or the like. A production method similar to that for a conventional, liquid electrolyte rectangular battery can be employed. In addition, this battery has a great advantage in that electrolytic solutions having arbitrary compositions can be used.

However, the step of merely charging the electrolytic solution containing monomers into the battery makes it difficult to appropriately control the gel amount at an interface between the electrode and the separator. The electrolyte formed at an interface having a large distance between the electrode and the separator upon charging the electrolytic solution has an increased thickness, thus lowering the ion conduction properties. An unsatisfactory gel electrolyte is formed at an interface having a small distance between the electrode and the separator, and has only poor adhesion, so that lithium deposition is caused upon charging, thus lowering the cycle characteristics. There is a possibility that the polymer matrix is not completely impregnated with the electrolytic solution, forming a portion having no electrolyte. Such an uneven gel electrolyte causes uneven reactivity, leading to deformation of the battery or deterioration of the cycle characteristics.

Polyether has properties such that polyether itself can be used as a solid electrolyte and there is no need to form a gel electrolyte from polyether using an electrolytic solution, and therefore studies have been made on polyether. Polyether can also be used in the form of a gel with an electrolytic solution, and the gel can be produced by mixing the polymer with a molten electrolyte and cooling the resultant mixture, or polymerizing monomers. However, the negative charge of oxygen atoms in polyether attracts the positive charge of lithium cations to inhibit the lithium ions from moving, and hence the polyether used as a gel electrolyte is not excellent in ion conduction properties, and therefore the polyether gel electrolyte is rarely used in lithium battery products.

Polyvinylidene fluoride is a material having such excellent chemical and electrochemical stability in a battery that it is used as a bonding agent for active material in the production of electrode. Unlike polyether, polyvinylidene fluoride has no interaction with lithium cations and hence is excellent in ion conduction properties.

As an example of the method for producing a gel electrolyte using polyvinylidene fluoride and a battery using the gel electrolyte, the following method has been proposed in a related art.

Gel was first prepared from a polymer solution, and the solvent in the gel is extracted using a poor solvent to polyvinylidene fluoride to form a sponge-like porous material having about 1 µm to 5 µm pores. Then, an arbitrary electrolytic solution is added to the resultant porous material to prepare a gel electrolyte. Subsequently, the porous material is formed on a separator or electrode surface, and then they are together rolled to form a battery, followed by charging of an electrolytic solution into the battery, thus producing a gel electrolyte and a gel electrolyte battery.

This method has an advantage in that the solution containing polyvinylidene fluoride dissolved used in the preparation of a gel electrolyte is independent of the solution for battery and therefore the electrolytic solution for battery is irrelevant to the restriction on the solvent used in the preparation of gel. Further, this method has a feature such that a porous material having excellent liquid absorption is formed by extraction and an arbitrary electrolytic solution is charged.

However, this method has the following problems:

(1) The steps in the method are complicated and cumbersome, thereby increasing the production cost.

(2) The gel, which is once formed on an electrode, must be subjected to cleaning and extraction.

(3) The poor solvent used in the extraction is mainly a protic solvent, such as ethanol or water, which is not suitable for the lithium ion battery, and the electrode must be well dried after the cleaning.

(4) Further, steps for charging the electrolytic solution into the battery and sealing the battery are required.

(5) After formed on a separator, the gel electrode must be well cleaned and dried similarly, and it is difficult to form a porous polymer film on a thin and flexible polyolefin separator.

For solving the problems, for example, Japanese Patent Application Publication (KOKAI) 2000-243447 (Patent Document 1) and Japanese Patent Application Publication (KOKAI) 2001-167797 (Patent Document 2) suggest a method in which a gel electrolyte membrane is formed without using the above-mentioned extraction method, has been proposed. In this method, as described in Patent Documents 1 and 2, an electrolytic solution and polyvinylidene fluoride are mixed to form a gel electrolyte membrane on an electrode, and there is no need to form a porous material by extraction, and an excellent lithium ion polymer battery can be provided.

However, in the method for forming a gel electrolyte membrane described in Patent Documents 1 and 2, the gel components are dissolved in a diluent solvent, and the solvent is evaporated so as to make the other components be gelled, and therefore the electrolyte cannot contain a large amount of a solvent having a low boiling point and a low viscosity, thus making it difficult to obtain a battery exhibiting satisfactory properties in an environment at very low temperatures.

SUMMARY

The present application provides a gel electrolyte containing a large amount of a solvent having a low boiling point and a low viscosity, and a gel electrolyte battery using the gel electrolyte and having excellent temperature characteristics, excellent current characteristics, excellent capacity, and excellent charge-discharge characteristics at low temperatures.

The present inventors have conducted extensive and intensive studies with a view toward solving the above-mentioned problems. As a result, they have succeeded in producing a battery having improved low-temperature performance by applying a sol electrolyte composed of polyvinylidene fluoride copolymerized with at least hexafluoropropylene (HFP) in an amount of 3 wt % or more and 7.5 wt % or less, an electrolytic solution, and a diluent solvent to an electrode and drying it at a high speed to form a gel electrolyte membrane containing a large amount of a low-viscosity solvent. Furthermore, they have found that, when using a three-component polyvinylidene fluoride copolymer with hexafluoropropylene and monochlorotrifluoroethylene (CTFE), the battery is further improved in properties.

Specifically, for solving the above problems, a gel electrolyte according to one embodiment has a matrix polymer; a nonaqueous solvent and an electrolytic solution having an electrolyte salt composed of lithium dissolved in the nonaqueous solvent, the matrix polymer being swollen with the electrolytic solution. The matrix polymer is composed of polyvinylidene fluoride copolymerized with at least hexafluoropropylene in an amount of 3 wt % or more and 7.5 wt % or less. The nonaqueous solvent is composed of ethylene carbonate; and at least one solvent selected from the group consisting of dimethyl carbonate, ethylmethyl carbonate, diethyl carbonate, ethylpropyl carbonate, ethyl butyl carbonate and dipropyl carbonate. The content of the ethylene carbonate in the nonaqueous solvent is 15 wt % or more and 55 wt % or less. The content of the sum of the at least one solvent in the nonaqueous solvent is 30 wt % or more and 85 wt % or less.

A gel electrolyte battery according to another embodiment has a positive electrode composed of a cathode active material applied to a current collector for positive electrode; a negative electrode composed of an anode active material applied to a current collector for negative electrode; a separator; and a gel electrolyte. The gel electrolyte has a matrix polymer; a nonaqueous solvent and an electrolytic solution having an electrolyte salt composed of lithium dissolved in the nonaqueous solvent, the matrix polymer being swollen with the electrolytic solution. The matrix polymer is composed of polyvinylidene fluoride copolymerized with at least hexafluoropropylene in an amount of 3 wt % or more and 7.5 wt % or less. The nonaqueous solvent is composed of: ethylene carbonate; and at least one solvent selected from the group consisting of dimethyl carbonate, ethylmethyl carbonate, diethyl carbonate, ethylpropyl carbonate, ethyl butyl carbonate and dipropyl carbonate. The content of the ethylene carbonate in the nonaqueous solvent is 15 wt % or more and 55 wt % or less. The content of the sum of the at least one solvent in the nonaqueous solvent is 30 wt % or more and 85 wt % or less.

According to an embodiment of the present invention, as the matrix polymer, polyvinylidene fluoride copolymerized with at least hexafluoropropylene in an amount of 3 wt % or more and 7.5 wt % or less is used and therefore, the electrolyte has improved compatibility with the nonaqueous solvent. In addition, the nonaqueous solvent comprises 15 wt % or more and 55 wt % or less of ethylene carbonate against all nonaqueous solvent component and 30 wt % or more and 85 wt % or less of at least one solvent having a viscosity lower than that of ethylene carbonate, and therefore not only can the battery be improved in low-temperature characteristics, but also the battery can be prevented from lowering in capacity.

Additional features and advantages are described herein, and will be apparent from, the following Detailed Description and the figures.

DETAILED DESCRIPTION

Figure 1:
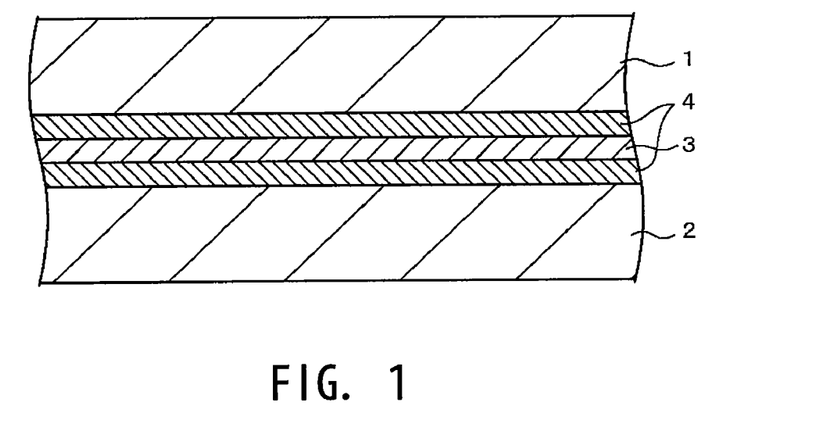
FIG. 1 is an enlarged cross-sectional view of a gel electrolyte battery according to an embodiment.

A description in further detail is provided below according to various embodiments and with reference to the accompanying drawings. As shown in FIG. 1, a gel electrolyte battery according to one embodiment includes a strip positive electrode 1, a strip negative electrode 2 disposed so that it faces the positive electrode 1, a separator 3 disposed between the positive electrode 1 and the negative electrode 2, and gel electrolyte layers 4 individually formed between the positive electrode 1 and the separator 3 and between the negative electrode 2 and the separator 3.

Figure 2:
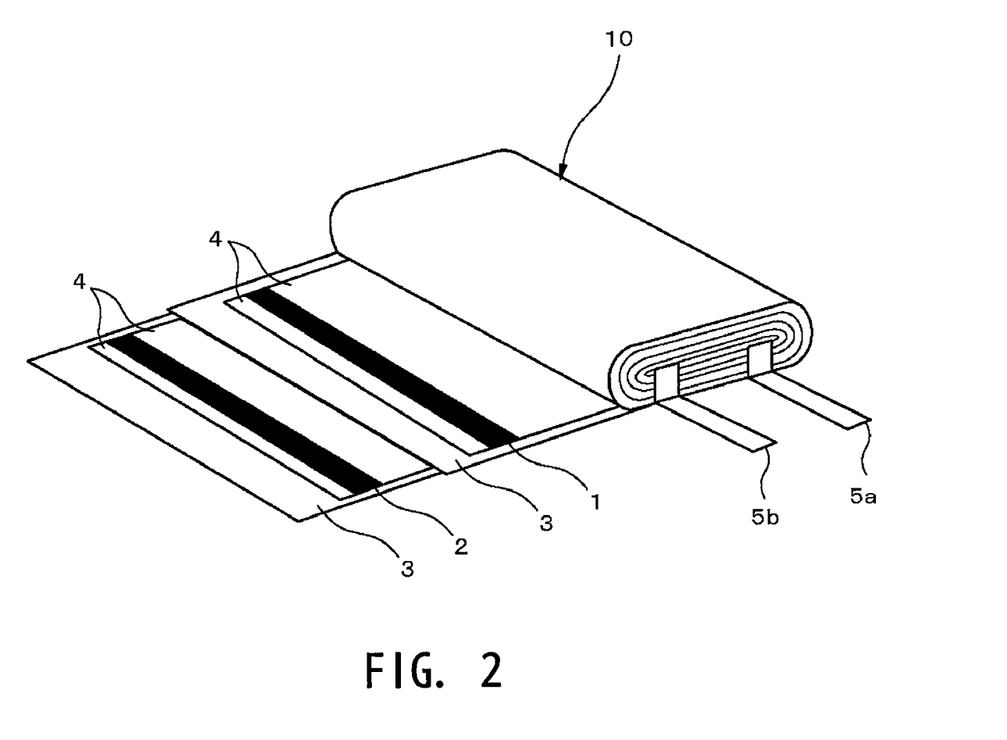
FIG. 2 is a diagrammatic view showing the construction of the electrode wound body in an embodiment.

This battery, as shown in FIG. 2, has an electrode wound body 10 having the positive electrode 1 and the negative electrode 2 which are stacked through the separator 3 and the gel electrolyte layers 4 and rolled in a longitudinal direction, and a positive electrode terminal 5a and a negative electrode terminal 5b are electrically introduced from the electrode wound body 10.

Figure 3:
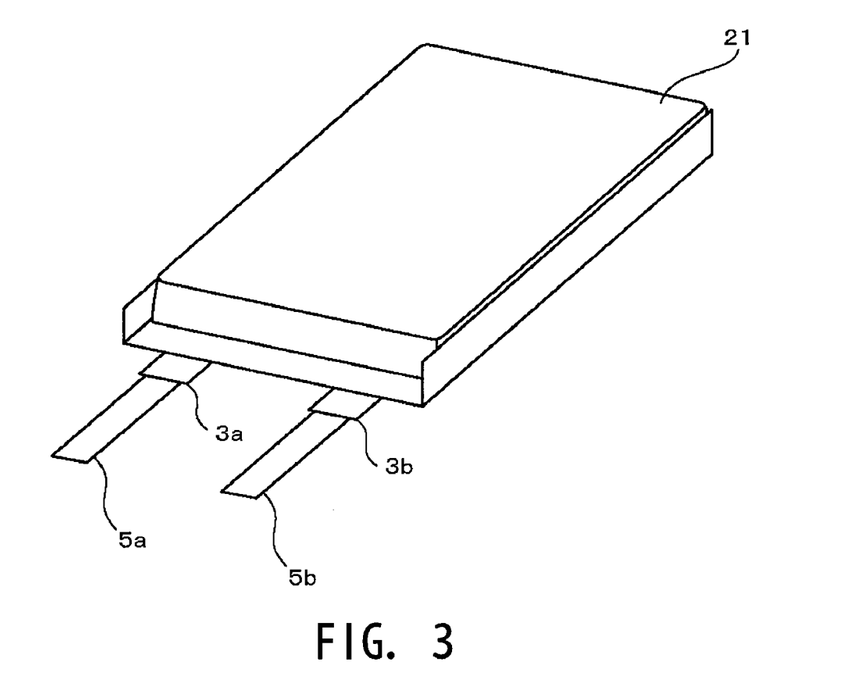
FIG. 3 is a perspective view showing the construction of a gel electrolyte battery according to an embodiment.

As shown in FIG. 3, the electrode wound body 10 is covered with and sealed in an external packaging material 21 composed of an insulating material to form a gel electrolyte battery. In this gel electrolyte battery, the positive electrode terminal 5a and the negative electrode terminal 5b electrically introduced from the electrode wound body 10 are disposed between and pressed by sealing portions which are edges of the external packaging material 21, and a resin leaf 3a and a resin leaf 3b are disposed at contact portions of the external packaging material 21 with the positive electrode terminal 5a and the negative electrode terminal 5b.

[Positive Electrode]

Figure 4:
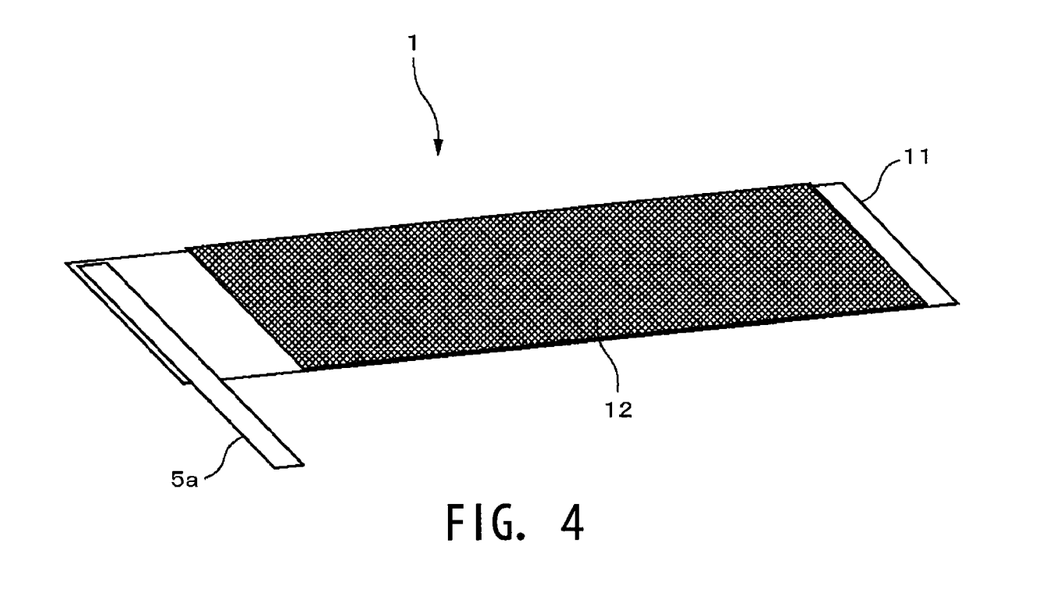
FIG. 4 is a diagrammatic view showing the construction of the positive electrode in an embodiment.

In the positive electrode 1, as shown in FIG. 4, a positive electrode active material layer 12 containing a positive electrode active material is formed on both sides of a positive electrode current collector 11. As the positive electrode current collector 11, a metallic foil, such as an aluminum (Al) foil, is used.

The positive electrode active material layer 12 is formed by first intimately mixing, for example, a positive electrode active material, a conducting material, and a binder to prepare a positive electrode composition, and dispersing the positive electrode composition in a solvent to form a slurry, and then uniformly applying the slurry to the positive electrode current collector 11 by a doctor blade method or the like, and drying the slurry at a high temperature to remove the solvent. The amounts of the positive electrode active material, conductor, binder, and solvent may be arbitrary as long as they are uniformly dispersed.

As the positive electrode active material, a compound oxide of lithium and a transition metal can be used. Specific examples of positive electrode active materials include $LiCoO_2$, $LiNiO_2$, and $LiMn_2O_4$. Alternatively, a solid solution obtained by replacing, for example, part of the transition metal element in the oxide by another element can be used, and examples of solid solutions include $LiNi_{0.5}Co_{0.5}O_2$ and $LiNi_{0.8}Co_{0.2}O_2$.

As the conducting material, for example, a carbon material can be used. As the binder, for example, polyvinylidene fluoride or polytetrafluoroethylene can be used. As the solvent, for example, N-methylpyrrolidone (NMP) can be used.

The positive electrode 1 has the positive electrode terminal 5a joined by, for example, spot welding or ultrasonic welding to another end as viewed in a longitudinal direction. It is desired that the positive electrode terminal 5a is composed of, for example, a metallic foil or mesh, but the positive electrode terminal may be composed of any material other than metals as long as it is electrochemically and chemically stable and electrically conductive. As an example of the material for the positive electrode terminal 5a, there can be mentioned aluminum.

It is preferred that the positive electrode terminal 5a points in the same direction as that of the negative electrode terminal 5b, but it may point in any directions as long as short-circuiting or the like does not occur and there is no adverse effect on the battery performance. With respect to the joint of the positive electrode terminal 5a, the joint position and the method for the joint are not limited to the examples mentioned above as long as electrical contact can be made.

[Negative Electrode]

Figure 5:
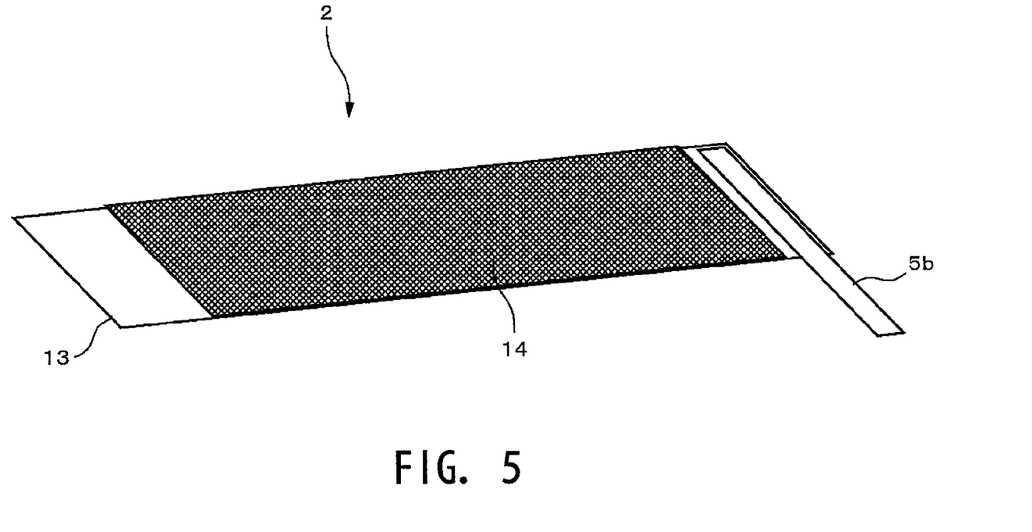
FIG. 5 is a diagrammatic view showing the construction of the negative electrode in an embodiment.

In the negative electrode 2, as shown in FIG. 5, a negative electrode active material layer 14 containing a negative electrode active material is formed on both sides of a negative electrode current collector 13. As the negative electrode current collector 13, a metallic foil, such as a copper (Cu) foil, can be used.

The negative electrode active material layer 14 is formed by first uniformly mixing, for example, a negative electrode active material and, if necessary, a conducting material, and a binder to prepare a negative electrode composition, and dispersing the negative electrode composition in a solvent to form a slurry, and then uniformly applying the slurry to the negative electrode current collector 13 by a doctor blade method or the like, and drying the slurry at a high temperature to remove the solvent. The amounts of the negative electrode active material, conductor, binder, and solvent may be arbitrary as long as they are uniformly dispersed.

As the negative electrode active material, a lithium metal, a lithium alloy, a carbon material capable of being doped and dedoped with lithium, or a composite of a metal material and a carbon material can be used. Specifically, as a carbon material capable of being doped and dedoped with lithium, for example, graphite, hardly graphitizable carbon, or easily graphitizable carbon can be used.

As graphite, artificial graphite or natural graphite, such as methophase carbon microbeads, carbon fibers, or coke, can be used. As a material capable of being alloyed with lithium, a variety types of metals can be used, but Sn (tin), Co (cobalt), In (indium), Al, Si (silicon), or an alloy thereof is generally used. In a case of using metallic lithium, it is not always necessary to mix lithium powder with a binder to form a coating film, and a rolled Li metal sheet can be also used.

As the binder, for example, polyvinylidene fluoride or a styrene-butadiene rubber can be used. As the solvent, for example, N-methylpyrrolidone (NMP) or methyl ethyl ketone can be used.

The negative electrode 2 has the negative electrode terminal 5b joined by, for example, spot welding or ultrasonic welding to another end as viewed in the longitudinal direction. It is desired that the negative electrode terminal 5b is composed of a metallic foil or ribbon, or a metal mesh, but the negative electrode terminal may be composed of any material other than metals as long as it is electrochemically and chemically stable and electrically conductive. Examples of materials for the negative electrode terminal 5b include copper and nickel (Ni).

It is preferred that the negative electrode terminal 5b points in the same direction as that of the positive electrode terminal 5a, but it may point in any directions as long as short-circuiting or the like does not occur and there is no adverse effect on the battery performance. With respect to the joint of the negative electrode terminal 5b, the joint position and the method for the joint are not limited to the examples mentioned above as long as electrical contact can be made.

[Electrolyte]

As the electrolyte, a gel electrolyte composed of a non-aqueous solvent gelled with a matrix polymer is used. As the matrix polymer, polyvinylidene fluoride is used. A polymer composed only of vinylidene fluoride (VDF) is insoluble in the solvent used in the electrolytic solution, and therefore a copolymer of vinylidene fluoride and hexafluoropropylene is used.

In the HFP-VDF copolymer, hexafluoropropylene in an amount of 3 wt % or more must be copolymerized. If the amount of the hexafluoropropylene copolymerized is smaller, the resultant copolymer has only low solubility. Further, the amount of the hexafluoropropylene copolymerized must be 7.5 wt % or less. If the amount of the hexafluoropropylene copolymerized is larger, the resultant gel electrolyte is sticky like glue and is difficult to handle, and, if the amount of the hexafluoropropylene copolymerized is too large, the solution is not gelled and remains in a liquid state.

With respect to the molecular weight of the matrix polymer, it is preferred that the number average molecular weight is in the range of from $5.0 \times 10^5$ to $7.0 \times 10^5$ (500,000 to 700,000), or the weight average molecular weight is in the range of from $2.1 \times 10^5$ to $3.1 \times 10^5$ (210,000 to 310,000), and the intrinsic viscosity is preferably in the range of from 1.7 to 2.1.

As the matrix polymer, an HFP-CTFE-VDF copolymer obtained by further copolymerizing the HFP-VDF copolymer with monochlorotrifluoroethylene is very advantageous since it is soluble in many types of solvents.

In the electrolytic solution to be gelled, the nonaqueous solvent includes ethylene carbonate which is a cyclic carbonate. Ethylene carbonate has a melting point as high as 38° C., which lowers the low-temperature characteristics of the battery, and hence cannot be used in a large amount, but ethylene carbonate forms a stable film on the surface of the negative electrode and is a solvent indispensable to a lithium battery. Ethylene carbonate has a high permittivity and promotes dissolution or dissociation of a salt. The content of ethylene carbonate in the entire nonaqueous solvent is 15 wt % or more and 55 wt % or less. If the ethylene carbonate content is smaller than 15 wt %, the resultant battery has a lowered capacity, so that the cycle characteristics become poor. On the other hand, if the ethylene carbonate content is larger than 55 wt %, the resultant battery has considerably poor low-temperature discharge characteristics.

Further, the nonaqueous solvent includes at least one solvent selected from the group consisting of dimethyl carbonate, ethylmethyl carbonate, diethyl carbonate, ethylpropyl carbonate (EPC), ethyl butyl carbonate (EBC) and dipropyl carbonate (DPC). Ethylene carbonate is a cyclic carbonate, whereas, dimethyl carbonate, ethylmethyl carbonate, diethyl carbonate, ethylpropyl carbonate, ethyl butyl carbonate and dipropyl carbonate are individually a linear carbonate. These solvents have a low permittivity, but they have a low viscosity, which enhances movement of ions and improves the battery in current characteristics. In addition, many of them have a low melting point, which improves the battery in low-temperature characteristics.

The content of the sum of at least one solvent selected from the group consisting of dimethyl carbonate, ethylmethyl carbonate, diethyl carbonate, ethylpropyl carbonate, ethyl butyl carbonate and dipropyl carbonate in the nonaqueous solvent is 30 wt % or more and 85 wt % or less. If this content is smaller than 30 wt %, the majority of the solvent is composed of a high-viscosity solvent, such as ethylene carbonate or propylene carbonate, thus lowering the low-temperature characteristics of the battery. On the other hand, if this content is larger than 85 wt %, the ethylene carbonate content is relatively small, so that the capacity cycle of the battery becomes poor.

In addition to the above solvents, propylene carbonate may be used. Propylene carbonate has high reactivity with a graphite negative electrode and forms a film for inhibiting a cell reaction on the negative electrode, and it can be used in the form of a combination with ethylene carbonate or vinylene carbonate (VC).

Propylene carbonate has high permittivity and is effective in promoting dissociation of a salt, and has a melting point lower than that of ethylene carbonate and does not so lower the low-temperature characteristics of the battery as ethylene carbonate. Propylene carbonate is a solvent having compatibility with an HFP-VDF copolymer, and is advantageously used to form a gel electrolyte. The CTFE-HFP-VDF copolymer is soluble in not only propylene carbonate but also a linear organic solvent, such as dimethyl carbonate or ethylmethyl carbonate. A lactone, such as γ-butyrolactone (GBL), can also be used.

As the electrolyte salt, an electrolyte salt soluble in the above nonaqueous solvent can be used. Examples of electrolyte salts include lithium salts, such as $LiPF_6$, $LiBF_4$, $LiN(CF_3SO_2)_2$, $LiN(C_2F_5SO_2)_2$, and $LiClO_4$. Of these, $LiPF_6$ is the most useful electrolyte salt since it has excellent electrochemical stability and excellent thermal stability as well as high degree of dissociation.

With respect to the electrolyte salt concentration, there is no particular limitation as long as the electrolyte salt can be dissolved in the above solvent, but it is preferred that the lithium ion concentration is in the range of 0.4 mol/kg or more and 2.0 mol/kg or less, based on the nonaqueous solvent.

In production of the gel electrolyte, the electrolyte salt and the matrix polymer are first dissolved in the nonaqueous solvent to form a sol. If necessary, a diluent solvent may be used. The resultant sol electrolyte is applied to an electrode and cooled or the diluent solvent is volatilized to form a gel electrolyte membrane.

Good adhesion at the interface between the electrode and the separator 3 is important to various properties of the battery including cycle characteristics. In the heterogeneous crosslinked system, lithium metal is deposited on a portion lacking in the electrolyte, thus lowering the cycle characteristics of the battery, and therefore it is essential to uniformly apply the gel electrolyte to the electrode.

An electrochemical reaction proceeds at the interface between the active material and the electrolyte, and therefore it is necessary that the gel electrolyte membrane constituting the gel electrolyte layer 4 completely cover the active material surface of the electrode. In a case where a current collector exposed portion is formed on the electrode, the gel electrolyte membrane placed on this portion does not adversely affect the chemical or electrochemical reaction, but does cause a wasteful volume and hence it is desired that the gel electrolyte membrane is not formed. For covering the active material surface with the gel electrolyte membrane, it is preferred that the current collector foil at the boundary portion is covered with the gel electrolyte membrane to a certain extent. Specifically, it is preferred that, for example, the gel electrolyte membrane is not formed on a portion more than 6 mm away from the boundary between the current collector exposed portion and the active material portion.

The thus formed gel electrolyte membrane uniformly covers the electrode and advantageously bonds the interface between the electrode and the separator 3. In addition, the gel electrolyte membrane is not composed of a microsponge formed by a poor solvent extraction method, and hence can be formed by a simple process and has excellent liquid retaining properties. Further, in the method in which the sol is cooled to form a gel electrolyte membrane, an arbitrary solvent can be used. In the method in which a diluent solvent is volatilized to form a gel electrolyte membrane, a high boiling-point solvent can be used, and, after the electrode wound body 10 is placed in the external packaging, an arbitrary low boiling-point solvent can be charged into the packaging.

[Separator]

As the separator 3, a known separator for a lithium battery can be used. As the separator 3, for example, nonwoven fabric or a porous film composed of polyolefin, polytetrafluoroethylene, or polyester can be used, and especially preferred is a porous film composed of polyethylene or polypropylene.

The external packaging material 21 accommodates therein and seals the electrode wound body 10 composed of the positive electrode 1, the negative electrode 2, and the separator 3 which are together rolled, and having the gel electrolyte layer 4. The external packaging material 21 is formed of a moistureproof, insulating multilayer film composed of, for example, an aluminum foil sandwiched between a pair of resin films.

In the gel electrolyte battery, the resin leaf 3a and the resin leaf 3b may be respectively disposed at contact portions of the external packaging material 21 with the positive electrode terminal 5a and the negative electrode terminal 5b. Arrangement of the resin leaves 3a and 3b respectively disposing at contact portions of the external packaging material 21 with the positive electrode terminal 5a and the negative electrode terminal 5b prevents short-circuiting due to, for example, a fin of the external packaging material 21 from occurring, and further improves the adhesion of the external packaging material 21 to the positive electrode terminal 5a and the negative electrode terminal 5b.

Next, an example of the method for producing a gel electrolyte battery according to one embodiment of the present invention is described with reference to FIGS. 2, 4 and 5. A gel electrolyte layer 4 is first formed individually on a strip positive electrode 1 and a strip negative electrode 2. The gel electrolyte layer 4 is formed by mixing together, for example, an electrolytic solution having an electrolyte salt dissolved in a nonaqueous solvent, a matrix polymer, and a diluent solvent and dissolving the polymer to prepare a sol electrolyte, and uniformly applying the sol electrolyte to both sides of each of the positive electrode 1 and the negative electrode 2, and then volatilizing the diluent solvent under predetermined conditions for drying. In this case, as the nonaqueous solvent, a cyclic carbonate, such as ethylene carbonate, is used. A positive electrode terminal 5a is preliminarily attached to the end of a positive electrode current collector 11 by, for example, spot welding, and a negative electrode terminal 5b is preliminarily attached to the end of a negative electrode current collector 13 by, for example, spot welding.

Figure 6:
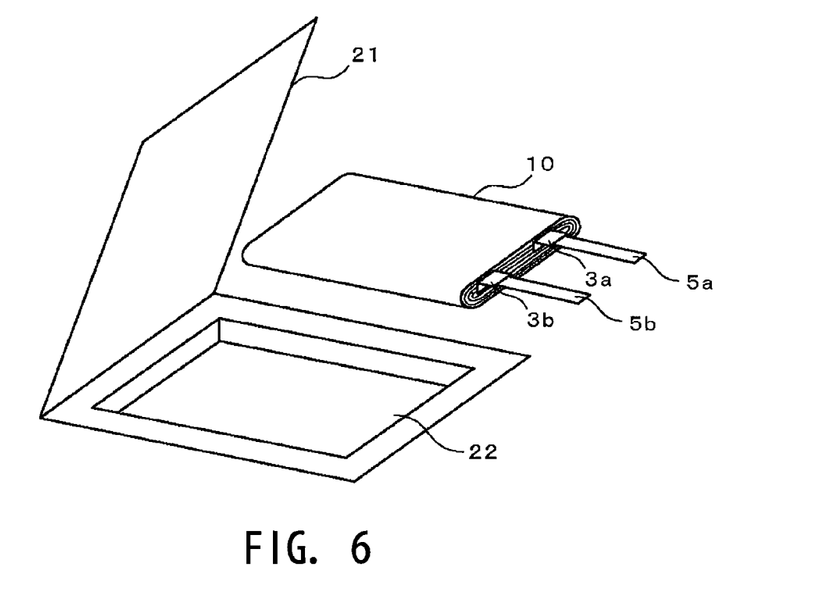
FIG. 6 is a diagrammatic view showing the construction of a gel electrolyte battery according to an embodiment.

Next, the strip positive electrode 1 and the strip negative electrode 2 each having formed thereon the gel electrolyte layer 4 are stacked having a separator 3 in between to form a stacked body, and then the stacked body is rolled in the longitudinal direction to form an electrode wound body 10. Then, as shown in FIG. 6, an external packaging material 21 composed of a laminate film is subjected to deep draw processing to form a recess portion 22 in the packaging material, and the electrode wound body 10 is inserted to the recess portion 22. Then, an unprocessed portion of the external packaging material 21 is folded and put over the recess portion 22, and sealed by hot-melting the outer periphery of the recess portion 22. In this instance, an opening is left in part of the packaging. A portion of the positive electrode terminal 5a having a resin leaf 3a and a portion of the negative electrode terminal 5b having a resin leaf 3b are disposed between and pressed by sealing portions of the external packaging material 21.

Next, an electrolytic solution having an electrolyte salt dissolved in a low-viscosity solvent, such as dimethyl carbonate or ethylmethyl carbonate, is charged into the battery through the opening, and then the opening is sealed up in a vacuum, thus producing a gel electrolyte battery according to one embodiment of the present invention.

In the above-mentioned example of the method for producing a gel electrolyte battery according to one embodiment, a low-viscosity solvent is charged into the battery after the electrode wound body is placed in the external packaging material, but it may be arranged so that the low-viscosity solvent is not charged separately and the gel is formed by mixing the low-viscosity solvent into the nonaqueous solvent upon preparing a sol and volatilizing the diluent solvent under milder conditions for drying thereby allowing the low-viscosity solvent contained in the sol to remain.

In the following Examples, for confirming the effect of the present invention, gel electrolyte batteries of samples 1 to 36 were prepared, and their properties were evaluated.

TABLE 1

| SAMPLE | POLYMER (wt %) | | | ELECTROLYTIC SOLUTION ORIGINALLY CONTAINED IN SOL (WT %) | | | ELECTROLYTIC SOLUTION CHARGED LATER (WT %) | | | | | | LENGTH OF GEL COVERING CURRENT COLLECTOR (MM) | |
|---|---|---|---|---|---|---|---|---|---|---|---|---|---|---|
| | PVdF | HFP | CTFE | EC | PC | GBL | DMC | EMC | DEC | EPC | EBC | DPC | Inner | Outer |
| SAMPLE 1 | 93.1 | 6.9 | 0.0 | 20 | 20 | | | 35 | 25 | | | | 2 | 3 |
| SAMPLE 2 | 90.0 | 5.0 | 5.0 | 20 | 20 | | | 35 | 25 | | | | 2.5 | 2.5 |
| SAMPLE 3 | 93.0 | 3.5 | 3.5 | 20 | 20 | 5 | 5 | 25 | 10 | 5 | 5 | 5 | 2 | 3 |
| SAMPLE 4 | 85.0 | 7.5 | 7.5 | 20 | 20 | 5 | 5 | 25 | 10 | 5 | 5 | 5 | 2.5 | 2.5 |
| SAMPLE 5 | 97.5 | 2.5 | 0.0 | 20 | 20 | | | 35 | 25 | | | | 2.5 | 2 |
| SAMPLE 6 | 92.0 | 8.0 | 0.0 | 20 | 20 | | | 35 | 25 | | | | 2 | 3 |
| SAMPLE 7 | 91.0 | 6.0 | 3.0 | 10 | 20 | | | 65 | 5 | | | | 2.5 | 2 |
| SAMPLE 8 | 91.0 | 6.0 | 3.0 | 16 | 20 | | | 60 | 4 | | | | 3 | 2 |
| SAMPLE 9 | 91.0 | 6.0 | 3.0 | 54 | 0 | | | 40 | 6 | | | | 2.5 | 3 |
| SAMPLE 10 | 91.0 | 6.0 | 3.0 | 60 | 0 | | | 35 | 5 | | | | 3 | 3 |
| SAMPLE 11 | 91.0 | 6.0 | 3.0 | 50 | 25 | | | 20 | 5 | | | | 3 | 2 |
| SAMPLE 12 | 91.0 | 6.0 | 3.0 | 50 | 10 | | | 30 | 10 | | | | 2.5 | 3 |
| SAMPLE 13 | 91.0 | 6.0 | 3.0 | 20 | 0 | | | 50 | 30 | | | | 2.5 | 3 |
| SAMPLE 14 | 91.0 | 6.0 | 3.0 | 10 | 0 | | | 60 | 30 | | | | 3 | 2 |
| SAMPLE 15 | 91.0 | 6.0 | 3.0 | 25 | 10 | | | 50 | 15 | | | | −5 | −5 |
| SAMPLE 16 | 91.0 | 6.0 | 3.0 | 25 | 10 | | | 50 | 15 | | | | 1 | 1 |
| SAMPLE 17 | 91.0 | 6.0 | 3.0 | 25 | 10 | | | 50 | 15 | | | | 6 | 6 |
| SAMPLE 18 | 91.0 | 6.0 | 3.0 | 25 | 10 | | | 50 | 15 | | | | 14 | 10 |

TABLE 2

| SAMPLE | POLYMER (wt %) | | | ELECTROLYTIC SOLUTION CONTAINED IN SOL (wt %) | | | | | | | | | LENGTH OF GEL COVERING CURRENT COLLECTOR (mm) | |
|---|---|---|---|---|---|---|---|---|---|---|---|---|---|---|
| | PVdF | HFP | CTFE | EC | PC | GBL | DMC | EMC | DEC | EPC | EBC | DPC | Inner | Outer |
| SAMPLE 19 | 93.1 | 6.9 | 0.0 | 20 | 20 | | | 35 | 25 | | | | 2 | 3 |
| SAMPLE 20 | 90.0 | 5.0 | 5.0 | 20 | 20 | | | 35 | 25 | | | | 3 | 2 |
| SAMPLE 21 | 93.0 | 3.5 | 3.5 | 20 | 10 | 5 | 5 | 25 | 15 | 5 | 5 | 5 | 2.5 | 3 |
| SAMPLE 22 | 85.0 | 7.5 | 7.5 | 20 | 10 | 5 | 5 | 25 | 15 | 5 | 5 | 5 | 3 | 2.5 |
| SAMPLE 23 | 97.5 | 2.5 | 0.0 | 20 | 10 | | | 35 | 25 | | | | 3 | 2 |
| SAMPLE 24 | 83.0 | 8.0 | 9.0 | 20 | 10 | | | 35 | 25 | | | | 2.5 | 2.5 |
| SAMPLE 25 | 91.0 | 5.0 | 4.0 | 10 | 20 | | | 65 | 5 | | | | 2 | 3 |
| SAMPLE 26 | 91.0 | 5.0 | 4.0 | 16 | 20 | | | 60 | 4 | | | | 2.5 | 3 |
| SAMPLE 27 | 91.0 | 5.0 | 4.0 | 54 | 0 | | | 40 | 6 | | | | 2.5 | 2 |
| SAMPLE 28 | 91.0 | 5.0 | 4.0 | 60 | 0 | | | 35 | 5 | | | | 2 | 2 |
| SAMPLE 29 | 91.0 | 5.0 | 4.0 | 50 | 25 | | | 20 | 5 | | | | 3 | 2 |
| SAMPLE 30 | 91.0 | 5.0 | 4.0 | 50 | 10 | | | 30 | 10 | | | | 2 | 3 |
| SAMPLE 31 | 91.0 | 5.0 | 4.0 | 20 | 0 | | | 50 | 30 | | | | 3 | 2 |
| SAMPLE 32 | 91.0 | 5.0 | 4.0 | 10 | 0 | | | 60 | 30 | | | | 2 | 3 |
| SAMPLE 33 | 91.0 | 5.0 | 4.0 | 25 | 10 | | | 50 | 15 | | | | −4 | −6 |
| SAMPLE 34 | 91.0 | 5.0 | 4.0 | 25 | 10 | | | 50 | 15 | | | | 1 | 1 |
| SAMPLE 35 | 91.0 | 5.0 | 4.0 | 25 | 10 | | | 50 | 15 | | | | 6 | 6 |
| SAMPLE 36 | 91.0 | 5.0 | 4.0 | 25 | 10 | | | 50 | 15 | | | | 9 | 12 |

Table 1 shows matrix polymers, solvent compositions, and conditions for forming a gel coating film in samples 1 to 18. Table 2 shows matrix polymers, solvent compositions, and conditions for forming a gel coating film in samples 19 to 36. Samples 1 to 36 are described below with reference to Tables 1 and 2.

<SAMPLE 1>

A positive electrode was first prepared as follows. In the preparation of a positive electrode, 92 wt % of lithium cobaltite (LiCoO$_2$), 3 wt % of powdery polyvinylidene fluoride, and 5 wt % of powdery graphite were dispersed in N-methylpyrrolidone to prepare a positive electrode composition in a slurry state.

Then, the positive electrode composition prepared was uniformly applied to both sides of an aluminum foil as a current collector for positive electrode, and dried under a reduced pressure at 100° C. for 24 hours to form a positive electrode active material layer. Subsequently, the resultant foil was pressed by means of a roll pressing machine to form a positive electrode sheet, and the positive electrode sheet was cut into a 50 mm×300 mm strip to obtain a positive electrode. A lead of aluminum ribbon was welded to an active material unapplied portion of the foil.

Next, a negative electrode was prepared as follows. In the preparation of a negative electrode, 91 wt % of artificial graphite and 9 wt % of powdery polyvinylidene fluoride were dispersed in N-methylpyrrolidone to prepare a negative electrode composition in a slurry state.

Then, the negative electrode composition prepared was uniformly applied to both sides of a copper foil as a current collector for negative electrode, and dried under a reduced pressure at 120° C. for 24 hours to form a negative electrode active material layer. Subsequently, the resultant foil was pressed by means of a roll pressing machine to form a negative electrode sheet, and the negative electrode sheet was cut into a 52 mm×320 mm strip to obtain a negative electrode. A lead of nickel ribbon was welded to a negative electrode composition unapplied portion of the foil.

Next, a gel electrolyte layer was formed as follows. Polyvinylidene fluoride copolymerized with hexafluoropropylene in an amount of 6.9 wt %, a nonaqueous electrolytic solution, and dimethyl carbonate as a diluent solvent were mixed with each other and dissolved by stirring to obtain a sol electrolyte. The electrolytic solution was prepared by mixing together 20 wt % of ethylene carbonate and 20 wt % of propylene carbonate and dissolving LiPF$_6$ in the mixed solvent so that the concentration became 1.0 mol/kg. The weight ratio of the components in the electrolyte was polyvinylidene fluoride: electrolytic solution:DMC=1:6:12.

Subsequently, the sol electrolyte obtained was uniformly applied to both sides of each of the positive electrode and the negative electrode. Then, the applied electrolyte was dried at 80° C. for 2 minutes to remove the solvent, thus forming gel electrolyte layers on both sides of each of the positive electrode and the negative electrode. The gel electrolyte layer was formed so that it completely covered the active material portion on the electrode. In this instance, the gel electrolyte was deposited on the current collector exposed portion 1 mm to 3 mm from the boundary.

Next, the thus prepared strip positive electrode having the gel electrolyte layers formed on both sides and strip negative electrode having the gel electrolyte layers formed on both sides were rolled in the longitudinal direction having a separator in between to obtain an electrode wound body. As the separator, a porous polyethylene film having a thickness of 10 μm and a porosity of 33% was used.

Finally, the electrode wound body was placed between a folded external packaging film, which is formed of an aluminum foil sandwiched between a pair of resin films, and the external packaging film was sealed by hot-melting the outer edges under a reduced pressure, thus wrapping the electrode wound body in the external packaging film. In this instance, an opening was left in part of the packaging. The portions of the positive electrode terminal and negative electrode terminal having thereon respective resin leafs were disposed between and pressed by sealing portions of the external packaging film.

Further, 1.2 g of an electrolytic solution, which was prepared by dissolving LiPF$_6$ in a mixed solvent containing 35 wt % of ethylmethyl carbonate and 25 wt % of diethyl carbonate so that the concentration became 1.0 mol/kg, was charged into the packaging through the opening, and the opening was sealed up in a vacuum, thus preparing a gel electrolyte battery of sample 1.

<SAMPLES 2 to 18>

Gel electrolyte batteries of samples 2 to 18 were individually prepared in substantially the same manner as in sample 1 except that the corresponding matrix polymers, solvent compositions, and conditions for forming a gel coating film shown in Table 1 were employed.

Next, gel electrolyte batteries of samples 19 to 36 were prepared by a method in which the sol was dried under milder conditions so that the low boiling-point solvent originally contained remained in the gel electrolyte.

<SAMPLE 19>

A positive electrode and a negative electrode were individually prepared in the same manner as in sample 1. A gel electrolyte was formed as follows. First, polyvinylidene fluoride copolymerized with hexafluoropropylene in an amount of 6.9 wt %, an electrolytic solution, and dimethyl carbonate as a diluent solvent were mixed with each other and dissolved by stirring to obtain a sol electrolyte. The electrolytic solution was prepared by mixing together 20 wt % of ethylene carbonate, 20 wt % of propylene carbonate, 35 wt % of ethylmethyl carbonate, and 25 wt % of diethyl carbonate and dissolving $LiPF_6$ in the mixed solvent so that the concentration became 1.0 mol/kg. The weight ratio of the components in the electrolyte was polyvinylidene fluoride:electrolytic solution:DMC=1:6:12.

Subsequently, the sol electrolyte obtained was uniformly applied to both sides of each of the positive electrode and the negative electrode. Then, the applied electrolyte was dried at 45° C. for one minute to form a gel electrolyte layer. The same subsequent procedure as that in sample 1 was conducted to form an electrode wound body.

Finally, the electrode wound body was placed between a folded external packaging film, which is formed of an aluminum foil sandwiched between a pair of resin films, and the external packaging film was sealed by hot-melting the outer edges under a reduced pressure, thus wrapping the electrode wound body in the external packaging film. The portions of the positive electrode terminal and negative electrode terminal having thereon respective resin leaves were disposed between and pressed by sealing portions of the external packaging film, thus preparing a gel electrolyte battery of sample 19.

<SAMPLES 20 to 36>

Gel electrolyte batteries of samples 20 to 36 were individually prepared in substantially the same manner as in sample 19 except that the corresponding matrix polymers, solvent compositions, and conditions for forming a gel coating film shown in Table 2 were employed.

<Evaluation of Battery Properties>

With respect to each of the above-prepared batteries of samples 1 to 18 and samples 19 to 36, measurements of the battery capacity, low-temperature characteristics, cycle characteristics, and cell thickness and a leakage test were conducted to evaluate the battery properties. In the following evaluation method, 1 C means a current with which the rated capacity of a battery is discharged in one hour, for example, 0.2 C, 0.5 C, and 3 C indicate currents with which the rated capacity of a battery is discharged in 5 hours, 2 hours, and 20 minutes, respectively. The battery of the embodiments of the present invention has a rated capacity of 700 mAh, and hence 0.2 C corresponds to 140 mA, 1 C corresponds to 700 mA, and 3 C corresponds to 2.1 A. With respect to the charging, a constant current and constant voltage charge at 1 C (=700 mA) at 4.2 V for 2.5 hours was performed. With respect to the discharging, a constant current discharge at 0.5 C was performed until the voltage became 3 V.

With respect to the battery capacity, a battery having a capacity of 700 mAh or more was rated as a non-defective product. With respect to the low-temperature characteristics, a ratio of the discharge capacity at −20° C. to the discharge capacity at 23° C. was measured, and a battery having a ratio of 50% or more was rated as a non-defective product. With respect to the cycle characteristics, a cycle of the charge at 1 C and the constant current discharge at 1 C until the voltage became 3 V was repeated and a ratio of the capacity after the 500th cycle to the initial capacity was determined, and a battery having a ratio of 70% or more was rated as a non-defective product. With respect to the cell thickness, a battery having a cell thickness of less than 4 mm was rated as a non-defective product. With respect to the leak test, a hole was formed in the external packaging of a battery and a load of 100 kgf/cm$^3$ was applied to the battery, and the battery was visually checked on liquid leakage.

The results of the measurements of battery capacity, low-temperature characteristics, cycle characteristics, and cell thickness with respect to the samples 1 to 18 and their evaluations are shown in Table 3. The results of the measurements of battery capacity, low-temperature characteristics, cycle characteristics, and cell thickness with respect to the samples 19 to 36 and their evaluations are shown in Table 4.

TABLE 3

| SAMPLE | BATTERY CAPACITY (mAh) | LOW-TEMPERATURE CHARACTERISTICS (%) | CYCLE CHARACTERISTICS (%) | CELL THICKNESS (mm) | LEAKAGE TEST | CAPACITY EVALUATION | LOW-TEMPERATURE CHARACTERISTICS EVALUATION | CYCLE CHARACTERISTICS EVALUATION |
|---|---|---|---|---|---|---|---|---|
| SAMPLE 1  | 770 | 60 | 75 | 3.9  | ◯ | ◯ | ◯ | ◯ |
| SAMPLE 2  | 765 | 62 | 77 | 3.85 | ◯ | ◯ | ◯ | ◯ |
| SAMPLE 3  | 775 | 61 | 76 | 3.9  | ◯ | ◯ | ◯ | ◯ |
| SAMPLE 4  | 760 | 63 | 74 | 3.87 | ◯ | ◯ | ◯ | ◯ |
| SAMPLE 5  | 680 | 54 | 34 | 3.88 | X | X | ◯ | X |
| SAMPLE 6  | 677 | 42 | 29 | 3.7  | X | X | X | X |
| SAMPLE 7  | 620 | 73 | 65 | 3.88 | ◯ | X | ◯ | X |
| SAMPLE 8  | 715 | 67 | 72 | 3.9  | ◯ | ◯ | ◯ | ◯ |
| SAMPLE 9  | 795 | 52 | 77 | 3.91 | ◯ | ◯ | ◯ | ◯ |
| SAMPLE 10 | 801 | 32 | 78 | 3.82 | ◯ | ◯ | X | ◯ |
| SAMPLE 11 | 815 | 21 | 79 | 3.82 | ◯ | ◯ | X | ◯ |
| SAMPLE 12 | 780 | 51 | 75 | 3.88 | ◯ | ◯ | ◯ | ◯ |
| SAMPLE 13 | 735 | 75 | 75 | 3.84 | ◯ | ◯ | ◯ | ◯ |
| SAMPLE 14 | 675 | 77 | 42 | 3.81 | ◯ | X | ◯ | X |
| SAMPLE 15 | —   | —  | —  | 3.79 | — | — | — | — |
| SAMPLE 16 | 770 | 63 | 75 | 3.82 | ◯ | ◯ | ◯ | ◯ |

TABLE 3-continued

| SAMPLE | BATTERY CAPACITY (mAh) | LOW-TEMPERATURE CHARACTERISTICS (%) | CYCLE CHARACTERISTICS (%) | CELL THICKNESS (mm) | LEAKAGE TEST | CAPACITY EVALUATION | LOW-TEMPERATURE CHARACTERISTICS EVALUATION | CYCLE CHARACTERISTICS EVALUATION |
|---|---|---|---|---|---|---|---|---|
| SAMPLE 17 | 773 | 64 | 76 | 3.89 | ○ | ○ | ○ | ○ |
| SAMPLE 18 | 781 | 63 | 75 | 4.05 | ○ | ○ | ○ | ○ |

TABLE 4

| SAMPLE | BATTERY CAPACITY (mAh) | LOW-TEMPERATURE CHARACTERISTICS (%) | CYCLE CHARACTERISTICS (%) | CELL THICKNESS (mm) | LEAKAGE TEST | CAPACITY EVALUATION | LOW-TEMPERATURE CHARACTERISTICS EVALUATION | CYCLE CHARACTERISTICS EVALUATION |
|---|---|---|---|---|---|---|---|---|
| SAMPLE 19 | 768 | 63 | 77 | 3.81 | ○ | ○ | ○ | ○ |
| SAMPLE 20 | 771 | 61 | 75 | 3.84 | ○ | ○ | ○ | ○ |
| SAMPLE 21 | 773 | 62 | 77 | 3.88 | ○ | ○ | ○ | ○ |
| SAMPLE 22 | 762 | 65 | 76 | 3.91 | ○ | ○ | ○ | ○ |
| SAMPLE 23 | 678 | 57 | 38 | 3.82 | X | X | ○ | X |
| SAMPLE 24 | 682 | 40 | 22 | 3.69 | X | X | X | X |
| SAMPLE 25 | 605 | 72 | 61 | 3.85 | ○ | X | ○ | X |
| SAMPLE 26 | 710 | 69 | 73 | 3.92 | ○ | ○ | ○ | ○ |
| SAMPLE 27 | 801 | 55 | 79 | 3.88 | ○ | ○ | ○ | ○ |
| SAMPLE 28 | 805 | 30 | 74 | 3.54 | ○ | ○ | X | ○ |
| SAMPLE 29 | 822 | 18 | 73 | 3.85 | ○ | ○ | X | ○ |
| SAMPLE 30 | 777 | 52 | 79 | 3.91 | ○ | ○ | ○ | ○ |
| SAMPLE 31 | 737 | 77 | 73 | 3.81 | ○ | ○ | ○ | ○ |
| SAMPLE 32 | 668 | 79 | 38 | 3.87 | ○ | X | ○ | X |
| SAMPLE 33 | — | — | — | 3.77 | — | — | — | — |
| SAMPLE 34 | 768 | 65 | 72 | 3.83 | ○ | ○ | ○ | ○ |
| SAMPLE 35 | 777 | 66 | 77 | 3.88 | ○ | ○ | ○ | ○ |
| SAMPLE 36 | 783 | 62 | 73 | 4.08 | ○ | ○ | ○ | ○ |

As can be seen from Tables 3 and 4, if the amount of the monochlorotrifluoroethylene or hexafluoropropylene copolymerized is too small, the resultant copolymer has poor compatibility with the solvent and a satisfactorily gelled electrolyte cannot be obtained, and therefore the interface between the electrode and the electrolyte is instable, so that the battery properties are thoroughly poor. Particularly, the battery has only a low resistance to the repetition of charging and discharging and hence has poor cycle characteristics. On the other hand, if the amount of the monochlorotrifluoroethylene or hexafluoropropylene copolymerized is too large, the electrolytic solution is not gelled and remains viscous liquid, and similarly the battery properties including cycle characteristics are poor.

Ethylene carbonate forms a stable film on the negative electrode and is advantageous to the charging and discharging, but it has a high melting point and hence is disadvantageous to the low-temperature characteristics. Therefore, if the ethylene carbonate content is too small, the resultant battery has a lowered capacity and hence has poor cycle characteristics. On the other hand, if the ethylene carbonate content is too large, the resultant battery has considerably poor low-temperature discharge characteristics.

The content of the sum of the low-viscosity solvents in the nonaqueous solvent is inversely proportional to the ethylene carbonate content. Therefore, if the content of the sum of the low-viscosity solvents is larger than an appropriate upper limit, the ethylene carbonate content is relatively small, so that the battery has poor capacity cycle. On the other hand, if the content of the sum of the low-viscosity solvents is too small, the content of a high-viscosity solvent, such as ethylene carbonate or propylene carbonate, in the non-aqueous solvent is large, so that the battery has poor low-temperature characteristics.

If the length of the gel applied portion is too short and there is an electrode exposed portion, the positive and negative electrodes cannot keep the distance between them appropriate and break the separator and are in contact with each other to cause internal short-circuiting, so that the battery cannot appropriately operate. On the other hand, if the length of the gel applied portion is too long, such an increased thickness is meaningless and disadvantageously increases the cell thickness.

Samples 5 and 23 were rated as defective products in respect of the leakage test, capacity evaluation, and cycle characteristics evaluation. The reason for this resides in that the amount of the hexafluoropropylene copolymerized is too small, so that the adhesion is poor. Samples 6 and 24 were rated as defective products in respect of the leakage test, capacity evaluation, low-temperature characteristics evaluation, and cycle characteristics evaluation. The reason for this resides in that the amount of the hexafluoropropylene copolymerized is too large, so that the electrolyte is not gelled. From the above, it is apparent that the amount of the hexafluoropropylene copolymerized in the matrix polymer must be 3 wt % or more and 7.5 wt % or less for a desired product.

Samples 10 and 28 were rated as defective products in respect of the low-temperature characteristics evaluation. The reason for this resides in that the ethylene carbonate content is too large. Samples 11 and 29 were rated as defective products in respect of the low-temperature characteristics evaluation. The reason for this resides in that the content of the sum of the low-viscosity solvents in the nonaqueous solvent is too small. Samples 14 and 32 were rated as defective products in respect of the capacity evaluation and cycle characteristics evaluation. The reason for this resides in that the ethylene carbonate content is too small, namely, the content of the sum of the low-viscosity solvents is too large. From the above, it is apparent that the content of ethylene carbonate in the nonaqueous solvent must be 15 wt % or more and 55 wt % or less for a desired product.

Samples 11 and 29 were rated as defective products in respect of the low-temperature characteristics evaluation. The reason for this resides in that the content of the sum of the low-viscosity solvents in the nonaqueous solvent is too small, namely, the ethylene carbonate or propylene carbonate content is too large. Samples 14 and 32 were rated as defective products in respect of the capacity evaluation. The reason for this resides in that the content of the sum of the low-viscosity solvents in the nonaqueous solvent is large and hence the ethylene carbonate content is relatively small. From the above, it is apparent that the content of the sum of at least one solvent, i.e., low-viscosity solvent selected from the group consisting of dimethyl carbonate, ethylmethyl carbonate, diethyl carbonate, ethylpropyl carbonate, and dipropyl carbonate in the nonaqueous solvent must be 30 wt % or more and 85 wt % or less for a desired product.

Samples 15 and 33 individually suffered short-circuiting due to the gel applied portion having too short a length. Samples 18 and 36 were rated as defective products in respect of the cell thickness increased due to the gel applied portion having too long a length.

The present application is not limited to the above-mentioned embodiments, and can be changed or modified in a suitable manner. In the above embodiment, the battery using an electrode wound body formed of a strip positive electrode and a strip negative electrode which are stacked through a separator and rolled in the longitudinal direction is described as an example, but the battery is not limited to this in the present application.

For example, a battery using a stacked electrode body formed of a positive electrode and a negative electrode which are stacked on one another, or a battery using a zigzag folded electrode body formed of an electrode which is not wound but so-called zigzag folded can be used. Further, in the above-mentioned gel electrolyte battery according to one embodiment, with respect to the shape, there is no particular limitation, and the battery may be cylindrical or rectangular, and can be in any size, e.g., thin or large in size.

According to an embodiment, a gel electrolyte containing a large amount of a low-viscosity solvent can be formed, and, by using the gel electrolyte, a gel electrolyte battery having excellent temperature characteristics, excellent current characteristics, excellent capacity, and excellent charge-discharge characteristics at low temperatures can be provided.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gel electrolyte comprising:
a matrix polymer;
a nonaqueous solvent; and
an electrolytic solution having an electrolyte salt containing lithium dissolved in the nonaqueous solvent, the matrix polymer being swollen with the electrolytic solution, wherein:
the matrix polymer comprises polyvinylidene fluoride copolymerized with at least hexafluoropropylene in an amount of 3 wt % or more and 7.5 wt % or less,
the nonaqueous solvent comprises ethylene carbonate; and at least one solvent selected from the group consisting of dimethyl carbonate, ethylmethyl carbonate, diethyl carbonate, ethylpropyl carbonate, ethyl butyl carbonate and dipropyl carbonate,
a content of the ethylene carbonate in the nonaqueous solvent is 15 wt % or more and 55 wt % or less, and
a total content of the at least one solvent in the nonaqueous solvent is 30 wt % or more and 85 wt % or less wherein the matrix polymer comprises the polyvinylidene fluoride further copolymerized with monochlorotrifluoroethylene in an amount of 3 wt % or more and 7.5 wt % or less.

2. The gel electrolyte of claim 1, wherein the nonaqueous solvent comprises: ethylene carbonate; and at least two solvents selected from the group consisting of dimethyl carbonate, ethylmethyl carbonate, diethyl carbonate, ethylpropyl carbonate, ethyl butyl carbonate, and dipropyl carbonate.

3. A gel electrolyte battery comprising a positive electrode, a negative electrode, a separator, and a gel electrolyte, wherein:
the gel electrolyte comprises:
a matrix polymer;
a nonaqueous solvent; and
an electrolytic solution having an electrolyte salt comprising lithium dissolved in a nonaqueous solvent, the matrix polymer being swollen with the electrolytic solution, wherein:
the matrix polymer comprises polyvinylidene fluoride copolymerized with at least hexafluoropropylene in an amount of 3 wt % or more and 7.5 wt % or less,
the nonagueous solvent comprises: ethylene carbonate; and at least one solvent selected from the group consisting of dimethyl carbonate, ethylmethyl carbonate, diethyl carbonate, ethylpropyl carbonate, ethyl butyl carbonate, dipropyl carbonate,
a content of the ethylene carbonate in the nonaqueous solvent is 15 wt % or more and 55 wt % or less,
a total content of the at least one solvent in the nonagueous solvent is 30 wt % or more and 85 wt % or less wherein the matrix polymer comprises the polyvinylidene fluoride further copolymerized with monochlorotrifluoroethylene in an amount of 3 wt % or more and 7.5 wt % or less.

4. The gel electrolyte baffery according to claim 3, wherein:
the negative electrode comprises at least one member selected from the group consisting of a carbon material, lithium metal, and a lithium alloy, and
the positive electrode comprises a lithium transition metal oxide capable of reversibly intercalating lithium.

5. The gel electrolyte battery according to claim 3, wherein:
each of the positive electrode and the negative electrode has formed thereon an active material applied portion and a current collector exposed portion,
at the interface between the active material applied portion at the separator, the gel electrolyte covers a portion of the current collector exposed portion about 6 mm or less away from the boundary between the current collector exposed portion and the active material applied portion.

6. The gel electrolyte battery of claim 3, wherein the non-aqueous solvent comprises: ethylene carbonate; and at least two solvents selected from the group consisting of dimethyl carbonate, ethylmethyl carbonate, diethyl carbonate, ethylpropyl carbonate, ethyl butyl carbonate, and dipropyl carbonate.

* * * * *